(12) United States Patent
Hatano et al.

(10) Patent No.: US 12,210,302 B2
(45) Date of Patent: Jan. 28, 2025

(54) IMAGE FORMING APPARATUS

(71) Applicant: Konica Minolta, Inc., Tokyo (JP)

(72) Inventors: Hokuto Hatano, Hachioji (JP); Shunichi Takaya, Hino (JP); Kazuhiro Saito, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/479,907

(22) Filed: Oct. 3, 2023

(65) Prior Publication Data

US 2024/0118649 A1 Apr. 11, 2024

(30) Foreign Application Priority Data

Oct. 3, 2022 (JP) .................. 2022-159684

(51) Int. Cl.
*G03G 21/00* (2006.01)
*G01J 3/50* (2006.01)
*G03G 15/20* (2006.01)

(52) U.S. Cl.
CPC .......... *G03G 15/2025* (2013.01); *G01J 3/501* (2013.01)

(58) Field of Classification Search
CPC .................. G03G 21/00; G03G 21/0094
USPC ........................ 399/343, 346, 353
See application file for complete search history.

(56) References Cited

U.S. PATENT DOCUMENTS 10,795,305 B1 * 10/2020 Kuribayashi ...... G03G 15/6585

FOREIGN PATENT DOCUMENTS

JP 2013-148623 8/2013

* cited by examiner

*Primary Examiner* — Hoan H Tran
(74) *Attorney, Agent, or Firm* — BakerHostetler

(57) ABSTRACT

An image forming apparatus includes: an image carrier; a solid lubricant; a lubricant application member that scrapes off the solid lubricant and applies the scraped solid lubricant to a surface of the image carrier; a colorimeter that performs colorimetry of a colorimetric surface of the solid lubricant; and a hardware processor that sets a lubricant application condition such that a predetermined amount of lubricant is applied on the basis of a colorimetric result obtained by the colorimeter.

12 Claims, 9 Drawing Sheets

IMAGE FORMING APPARATUS

This application claims priority to Japanese patent Application No. 2022-159684, filed on Oct. 3, 2022, the entire disclosure of which is incorporated herein by reference.

BACKGROUND

Technological Field

The present invention relates to an image forming apparatus.

Description of the Related Art

In an image forming apparatus (printer, copier, facsimile, and the like) using an electrophotographic process technology, a uniformly charged photoconductor may be irradiated with (exposed to) laser light based on image data, whereby an electrostatic latent image may be formed on the surface of the photoconductor. Then, by supplying toner to the photoconductor, the electrostatic latent image may be visualized as a toner image. This toner image, for example, may be directly transferred from a photoconductor or indirectly transferred to a recording material via an intermediate transfer member, and then heated and pressed by a fixing device. Through the above steps, an image may be formed on the recording material.

Generally, the image forming apparatus includes a cleaning device that cleans transfer residual toner on the surface of the photoconductor. The cleaning device includes, for example, a cleaning unit that removes a transfer residual toner and a lubricant application unit that applies a lubricant to the surface of the photoconductor. The cleaning unit includes, for example, a cleaning member (e.g., rubber blade) that abuts on the surface of the photoconductor and slides on the surface of the photoconductor to remove the transfer residual toner. The lubricant application unit mainly scrapes off a solid lubricant with a lubricant application member (e.g., lubricant application brush), and applies the powdery lubricant to the surface of the photoconductor. As a result, it may be possible to reduce friction between the photoconductor and the cleaning member and curb wear of the photoconductor and the cleaning member. Furthermore, adhesion of the toner to the photoconductor may also be reduced, and the cleaning performance may be improved. From the viewpoint of improving maintainability and simplifying the apparatus configuration, the photoconductor and the cleaning device are often unitized and integrally attached to the image forming apparatus as a photosensitive unit.

Incidentally, in the lubricant application device, when the scraping amount of the lubricant may be increased, the life of the photoconductor and the cleaning member may be prolonged and the cleaning performance may be improved, but since the lubricant consumption amount may be increased, the timing of occurrence of a cleaning failure due to lubricant depletion may be advanced, and the life of the photosensitive unit may be shortened. On the other hand, if the scraping amount of the lubricant may be reduced in consideration of the lubricant depletion, the wear of the photoconductor and the cleaning member may be accelerated and the cleaning performance may be lowered, and the image quality may be deteriorated. Therefore, it may be important to apply an appropriate amount of lubricant from the viewpoint of prolonging the life of the photosensitive unit and maintaining the image quality.

However, a solid lubricant has different characteristics such as hardness for each raw material lot due to differences in manufacturing conditions, storage conditions such as temperature and humidity, and the like. Furthermore, the degree of state change (e.g., adhesion of lubricant) of the lubricant application member varies depending on use conditions (e.g., printing rate, use environment, durability, and the like) of the image forming apparatus. Therefore, even if the lubricant application conditions (e.g., rotation speed of lubricant application member, and the like) are the same, an appropriate amount of lubricant may be not always applied.

JP 2013-148623 A discloses a technology of grasping a lubricant application amount on the basis the color of a lubricant application member and controlling the operation of the lubricant application member. However, since the color of the lubricant application member also includes the influence of particles other than the lubricant such as toner and toner external additives adhering to the lubricant application member, there may be room for improvement in terms of accuracy.

SUMMARY

An object of the present disclosure may be to provide an image forming apparatus capable of appropriately controlling an application amount of a lubricant to an image carrier such as a photoconductor.

To achieve the abovementioned object, according to an aspect of the present invention, an image forming apparatus reflecting one aspect of the present invention comprises: an image carrier; a solid lubricant; a lubricant application member that scrapes off the solid lubricant and applies the scraped solid lubricant to a surface of the image carrier; a colorimeter that performs colorimetry of a colorimetric surface of the solid lubricant; and a hardware processor that sets a lubricant application condition such that a predetermined amount of lubricant may be applied on the basis of a colorimetric result obtained by the colorimeter.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention may be not limited to the disclosed embodiments.

Figure 1:
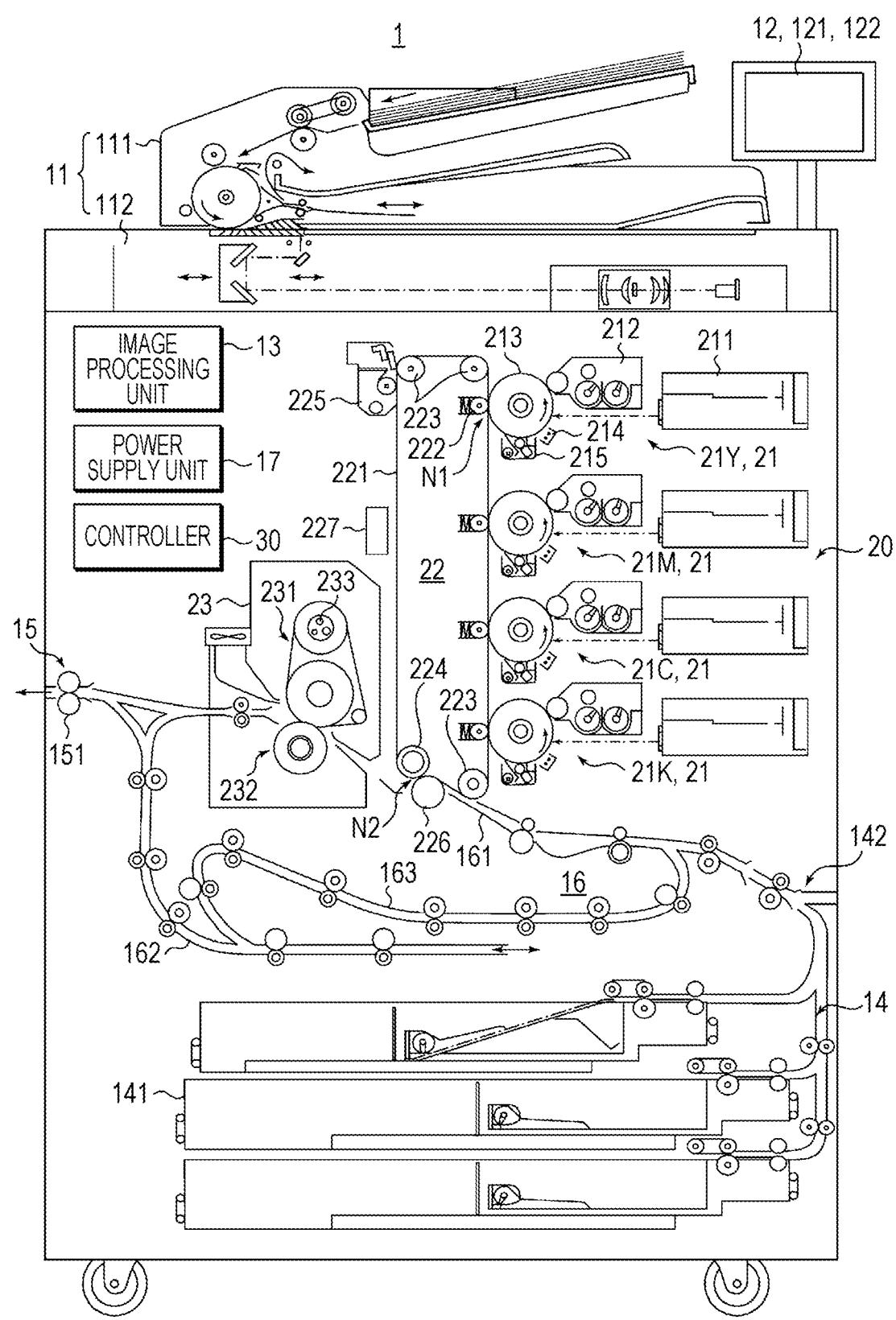
FIG. 1 may be a diagram illustrating an overall configuration of an image forming apparatus according to an embodiment of the present invention.
Figure 2:
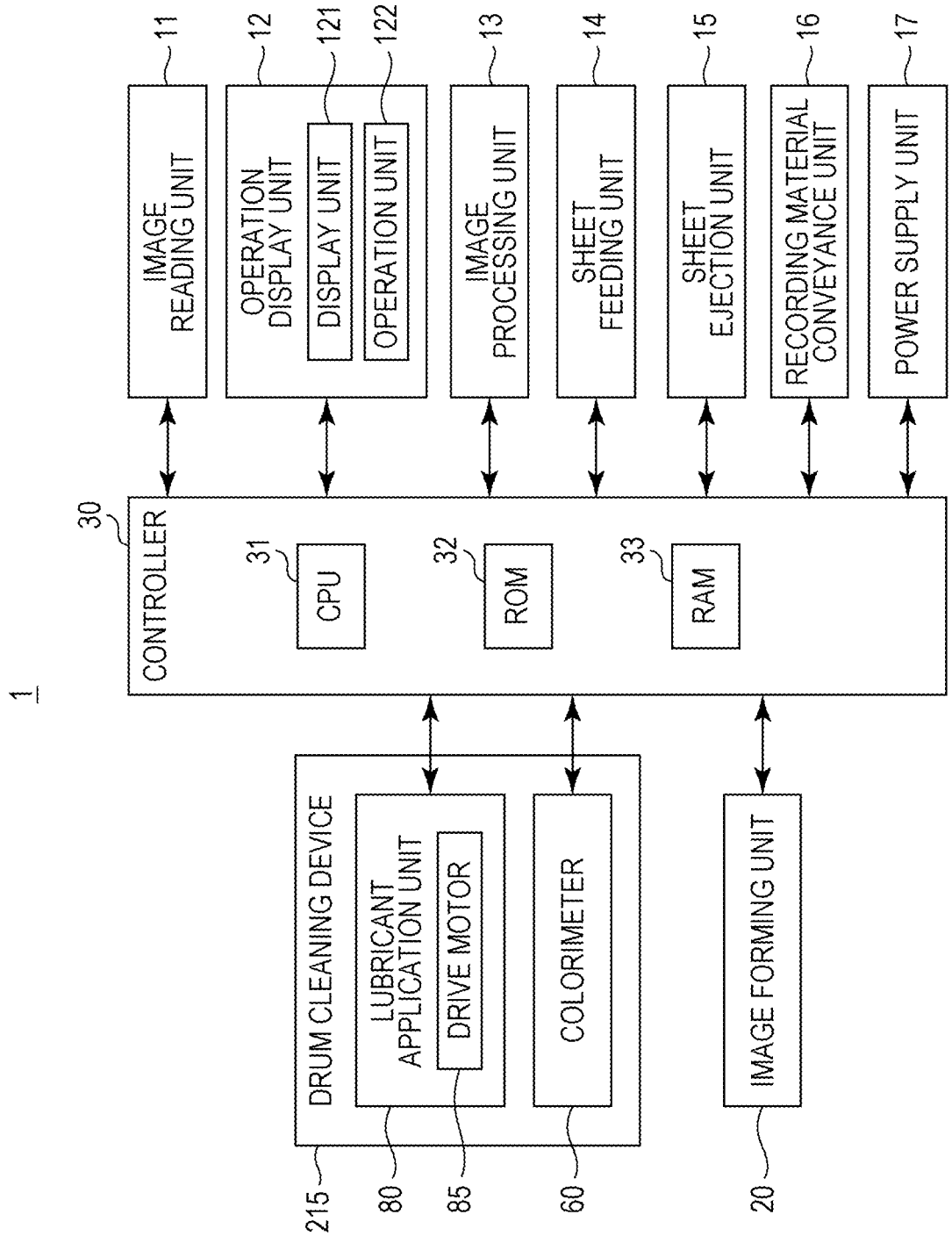
FIG. 2 may be a diagram illustrating a main part of a control system of the image forming apparatus according to the embodiment.

FIG. 1 may be a diagram illustrating an overall configuration of an image forming apparatus 1 according to an embodiment. FIG. 2 may be a diagram illustrating a main part of a control system of the image forming apparatus 1.

The image forming apparatus 1 illustrated in FIGS. 1 and 2 may be a color image forming apparatus of an intermediate transfer system using an electrophotographic process technology. The image forming apparatus 1 primarily transfers toner images of colors of yellow (Y), magenta (M), cyan (C), and black (K) formed on a photosensitive drum 213 to an intermediate transfer belt 221, superimposes the toner images of four colors on the intermediate transfer belt 221, and then secondarily transfers the toner images to a recording material to form an image.

In the present embodiment, the image forming apparatus 1 employs a vertical tandem system in which the photosensitive drums 213 corresponding to the four colors of CMYK are arranged in series in the traveling direction (vertical direction) of the intermediate transfer belt 221, and toner images of the colors are sequentially transferred to the intermediate transfer belt 221 in one procedure.

As illustrated in FIG. 1, the image forming apparatus 1 includes an image reading unit 11, an operation display unit 12, an image processing unit 13, a sheet feeding unit 14, a sheet ejection unit 15, a recording material conveyance unit 16, a power supply unit 17, an image forming unit 20, a controller 30, and the like.

The controller 30 performs overall control of the image forming apparatus 1 by controlling the image reading unit 11, the operation display unit 12, the image processing unit 13, the sheet feeding unit 14, the sheet ejection unit 15, the recording material conveyance unit 16, the power supply unit 17, and the image forming unit 20 according to their functions.

The controller 30 includes a central processing unit (CPU) 31 as an arithmetic/control device, a read only memory (ROM) 32 as a main storage device, a random-access memory (RAM) 33, and the like. The ROM 32 stores a basic program and basic setting data. Furthermore, the ROM 32 stores a program for achieving image forming processing such as a lubricant application control program. The CPU 31 reads a program corresponding to the processing content from the ROM 32, develops the program in the RAM 33, and executes the developed program, thereby controlling the operation of each functional block of the image forming apparatus 1.

Note that a part or the entire processing executed by the controller 30 may be executed by an electronic circuit such as a digital signal processor (DSP), an application specific integrated circuit (ASIC), or a programmable logic device (PLD) provided according to the processing.

In the present embodiment, the function of each functional block may be achieved by cooperation between each hardware forming the functional block and the controller 30. Note that some or all of the functions of the functional blocks may be achieved by the controller 30 executing a program.

The image reading unit 11 includes an automatic document feeder 111 called an auto document feeder (ADF), a document image scanner 112 (scanner), and the like.

The automatic document feeder 111 conveys a document placed on a document tray by a conveying mechanism and sends the document to the document image scanner 112. The automatic document feeder 111 may continuously read images (including both sides) of a large number of documents placed on the document tray.

The document image scanner 112 optically scans a document conveyed onto a contact glass from the automatic document feeder 111 or a document placed on the contact glass, forms an image of reflected light from the document on a light receiving surface of an imaging element (e.g., charge coupled device (CCD)), and reads a document image. The image reading unit 11 generates input image data on the basis of a reading result by the document image scanner 112.

The input image data may be subjected to predetermined image processing in the image processing unit 13.

The operation display unit 12 includes, for example, a flat panel display with a touch panel. As the flat panel display, a liquid crystal display, an organic EL display, or the like may be used. The operation display unit 12 includes a display unit 121 and an operation unit 122.

The display unit 121 displays various operation screens, image states, operation situations of functions, and the like in accordance with a display control signal input from the controller 30.

The operation unit 122 includes various operation keys such as a numeric keypad and a start key, receives various input operations by a user, and outputs an operation signal to the controller 30. The user may operate the operation display unit 12 to perform settings related to image formation such as document setting, image quality setting, magnification setting, application setting, output setting, and recording material setting.

The image processing unit 13 includes a circuit or the like that performs digital image processing according to initial setting or user setting on the input image data. For example, the image processing unit 13 performs tone correction on the basis of tone correction data under the control of the controller 30. Furthermore, the image processing unit 13 performs various types of correction processing such as color correction, shading correction, density correction, and the like on the input image data. The image forming unit 20 may be controlled on the basis of the image data subjected to the processing described above.

The image forming unit 20 includes an image former 21, an intermediate transfer part 22, and a fixer 23. The image former 21 forms a toner image by each color toner of a Y component, an M component, a C component, and a K component on the basis of input image data. The intermediate transfer part 22 transfers the toner image formed by the image former 21 to a recording material. The fixer 23 fixes the transferred toner image to the recording material.

Specifically, the image former 21 includes four image formers 21Y, 21M, 21C, and 21K for a Y component, an M component, a C component, and a K component. Since the image formers 21Y, 21M, 21C, and 21K have similar configurations, for convenience of illustration and description, common components are denoted by the same reference numerals, and Y, M, C, and K are added to the reference numerals to distinguish the components. Note that in FIG. 1, only the components of the image former 21Y for the Y component are denoted by reference numerals, and the reference numerals of the components of the other image formers 21M, 21C, and 21K are omitted.

The image former 21 includes an exposure device 211, a developing device 212, the photosensitive drum 213, a charging device 214, a drum cleaning device 215, and the like. Although not illustrated, the image former 21 may include a static eliminator for removing residual charge remaining on the surface of the photosensitive drum 213 after the primary transfer.

The photosensitive drum 213 is, for example, a negative charge type organic photoconductor (OPC) in which an under coat layer (UCL), a charge generation layer (CGL), and a charge transport layer (CTL) are sequentially laminated on a peripheral surface of an aluminum conductive cylindrical body (aluminum tube). The charge generation layer may be made of an organic semiconductor in which a charge generation material (e.g., phthalocyanine pigment) may be dispersed in a resin binder (e.g., polycarbonate), and generates a pair of positive charge and negative charge upon exposure by the exposure device 211. The charge transport layer may be formed by dispersing a hole transport material (electron-donating nitrogen-containing compound) in a resin binder (e.g., polycarbonate resin), and transports positive charge generated in the charge generation layer to the surface of the charge transport layer.

The charging device 214 includes, for example, a corona discharge generator such as a scorotron charging device or a corotron charging device. The charging device 214 uniformly charges the surface of the photosensitive drum 213 to negative polarity by corona discharge.

The exposure device 211 includes, for example, an LED print head (LPH), and includes an LED array in which a plurality of light emitting diodes (LEDs) are linearly arranged, an LPH driving unit (driver IC) for driving each LED, a lens array for forming an image of light emitted from the LED array on the photosensitive drum 213, and the like. One LED of the LED array corresponds to one dot of an image.

The exposure device 211 irradiates the photosensitive drum 213 with light corresponding to an image of each color component. The positive charge generated in the charge generation layer of the photosensitive drum 213 by receiving light irradiation may be transported to the surface of the charge transport layer, whereby the surface charge (negative charge) of the photosensitive drum 213 may be neutralized. As a result, an electrostatic latent image of each color component may be formed on the surface of the photosensitive drum 213 due to a potential difference from the surroundings.

The developing device 212 stores a developer (e.g., two-component developer containing toner and magnetic carrier) of each color component and attaches a toner of each color component to the surface of the photosensitive drum 213 to visualize the electrostatic latent image and form a toner image. Specifically, a developing bias voltage may be applied to a developer bearing member (e.g., developing roller (reference numeral omitted)), and an electric field may be formed between the photosensitive drum 213 and the developer bearing member. Then, due to the potential difference between the photosensitive drum 213 and the developer bearing member, the charged toner on the developer bearing member moves to and adheres to an exposed part on the surface of the photosensitive drum 213. As a result, the electrostatic latent image on the photosensitive drum 213 may be visualized.

The drum cleaning device 215 removes transfer residual toner remaining on the surface of the photosensitive drum 213 after the primary transfer. A detailed configuration of the drum cleaning device 215 will be described later.

The intermediate transfer part 22 includes the intermediate transfer belt 221, a primary transfer roller 222, a plurality of support rollers 223 and 224, a belt cleaning device 225, a secondary transfer roller 226, and the like.

The intermediate transfer belt 221 may be an image carrier that carries a toner image and may be a transfer object to which the toner image on the photosensitive drum 213 may be transferred. The intermediate transfer belt 221 includes an endless belt and may be stretched around the plurality of support rollers 223 in a loop shape. At least one of the plurality of support rollers 223 includes a driving roller, and the others include driven rollers. As the driving roller rotates, the intermediate transfer belt 221 travels at a constant speed.

The primary transfer roller 222 may be disposed on the inner peripheral surface side of the intermediate transfer belt 221 so as to face the photosensitive drum 213 of each color component. When the primary transfer roller 222 may be pressed against the photosensitive drum 213 with the intermediate transfer belt 221 interposed therebetween, a transfer nip N1 (hereinafter referred to as "primary transfer part N1") for transferring a toner image from the photosensitive drum 213 to the intermediate transfer belt 221 may be formed.

The support rollers 223 include the opposing roller 224 disposed opposite the secondary transfer roller 226. The secondary transfer roller 226 may be disposed on the outer peripheral surface side of the intermediate transfer belt 221 and may be pressed against the opposing roller 224 with the intermediate transfer belt 221 interposed therebetween. As a result, a transfer nip N2 (hereinafter referred to as "secondary transfer part N2") for transferring the toner image from the intermediate transfer belt 221 to the recording material may be formed.

In the primary transfer part N1, the toner images on the photosensitive drums 213 are sequentially superimposed and primarily transferred onto the intermediate transfer belt 221. Specifically, a primary transfer voltage may be applied to the primary transfer roller 222, and a charge having a polarity opposite to that of the toner may be applied to the inner peripheral surface side of the intermediate transfer belt 221 (side in contact with primary transfer roller 222), whereby the toner image may be electrostatically transferred from the photosensitive drum 213 to the intermediate transfer belt 221.

Thereafter, when the recording material passes through the secondary transfer part N2, the toner image on the intermediate transfer belt 221 may be secondarily transferred to the recording material. Specifically, a secondary transfer voltage may be applied to the secondary transfer roller 226, and a charge having a polarity opposite to that of the toner may be applied to the back surface side (side in contact with secondary transfer roller 226) of the recording material, whereby the toner image may be electrostatically transferred from the intermediate transfer belt 221 to the recording material. The recording material to which the toner image has been transferred may be conveyed toward the fixer 23.

The belt cleaning device 225 includes a belt cleaning blade (reference numeral omitted) that comes into sliding contact with the surface of the intermediate transfer belt 221. The belt cleaning device 225 removes transfer residual toner remaining on the surface of the intermediate transfer belt 221 after the secondary transfer.

The fixer 23 includes, for example, an upper fixer 231 having a fixing surface side member disposed on a fixing surface (surface on which toner image may be formed) side of the recording material, a lower fixer 232 having a back surface side support member disposed on a back surface (surface opposite to fixing surface) side of the recording material, a heating source 233 that heats the fixing surface side member, a pressure contact/separation unit (not illustrated) that brings the back surface side support member into pressure contact with the fixing surface side member, and the like.

The recording material onto which the toner image has been secondarily transferred and which has been conveyed along a sheet passage may be heated and pressurized when passing through the fixer 23. As a result, the toner image may be fixed to the recording material.

The sheet feeding unit 14 includes a sheet feeding tray 141 and a manual sheet feeder 142. In the sheet feeding tray 141, paper sheets (standard paper or special paper) identified on the basis of basis weight, size, and the like are stored for each preset paper type. A plurality of sheet feeding rollers (reference numerals omitted) are disposed in the sheet feeding tray 141 and the manual sheet feeder 142. A large-capacity external sheet feeding device (not illustrated) may be connected to the manual sheet feeder 142. The external sheet feeding device may be capable of feeding a continuous sheet such as a roll sheet, for example. The sheet feeding unit 14 sends the recording material fed from the sheet feeding tray 141 or the manual sheet feeder 142 to the recording material conveyance unit 16.

The sheet ejection unit 15 includes a sheet ejection conveyance roller 151 and the like and ejects the recording material fed from the recording material conveyance unit 16 to the outside of the apparatus.

The recording material conveyance unit 16 includes a main conveyor 161, a switchback conveyor 162, a conveyor for back surface printing 163, a sheet passage switching part (not illustrated), and the like. A part of the recording material conveyance unit 16 may be incorporated into one unit together with the fixer 23, for example, and may be detachably attached to the image forming apparatus 1.

The main conveyor 161 includes a plurality of conveyance rollers (reference numerals omitted) including a loop roller part and a registration roller part as a recording material conveyance element that sandwiches and conveys a recording material. The main conveyor 161 conveys the recording material fed from the sheet feeding unit 14 to pass through the image forming unit 20 (intermediate transfer part 22 and fixer 23) and conveys the recording material fed from the image forming unit 20 (fixer 23) to the sheet ejection unit 15 or the switchback conveyor 162.

The switchback conveyor 162 temporarily stops the recording material sent from the fixer 23, reverses the conveyance direction, and conveys the recording material to the sheet ejection unit 15 or the conveyor for back surface printing 163.

The conveyor for back surface printing 163 circularly conveys the recording material switched back by the switchback conveyor 162 to the main conveyor 161. The recording material may be passed through the main conveyor 161 in a state where its back surface may be an image forming surface.

The sheet passage switching part (not illustrated) may be disposed on the downstream side of the fixer 23 in the recording material conveyance direction and switches the sheet passage depending on whether the recording material sent out from the fixer 23 may be discharged as it is, flipped and discharged, or conveyed to the conveyor for back surface printing 163.

Specifically, the controller 30 controls the operation of the sheet passage switching part (not illustrated) on the basis of the processing content (single-sided/double-sided printing, face-up/face-down ejection, and the like) of the image forming processing.

The recording material fed from the sheet feeding unit 14 may be conveyed to the image forming unit 20 by the main conveyor 161. Then, when the recording material passes through the secondary transfer part, the toner images on the intermediate transfer belt 221 are collectively transferred to a first surface (front surface) of the recording material, and fixing processing may be performed in the fixer 23. The recording material on which an image may be formed may be ejected to the outside of the apparatus by the sheet ejection unit 15. In a case of forming images on both surfaces of a recording material, the recording material on which an image may be formed on the first surface may be sent to the switchback conveyor 162 and may be flipped by returning to the main conveyor 161 through the conveyor for back surface printing 163, and an image may be formed on a second surface (back surface).

The power supply unit 17 may be connected to a commercial AC power supply (not illustrated), converts AC power input from the commercial AC power supply into DC power, and supplies a necessary voltage to each unit.

Figure 3:
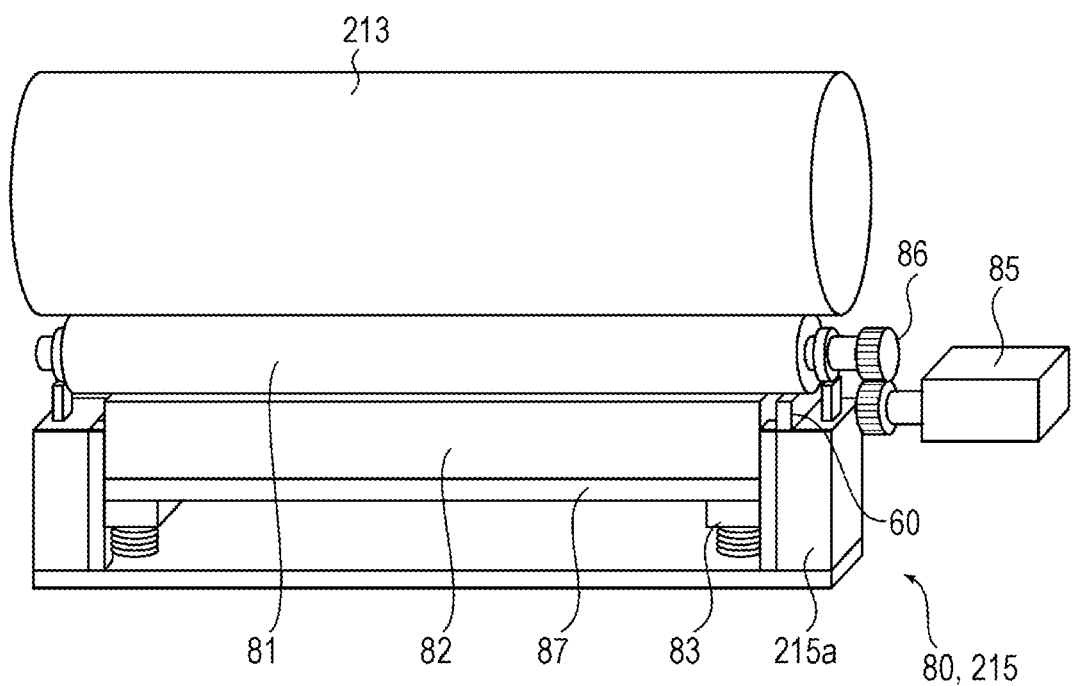
FIG. 3 may be a perspective view illustrating an example of a drum cleaning device.
Figure 4:
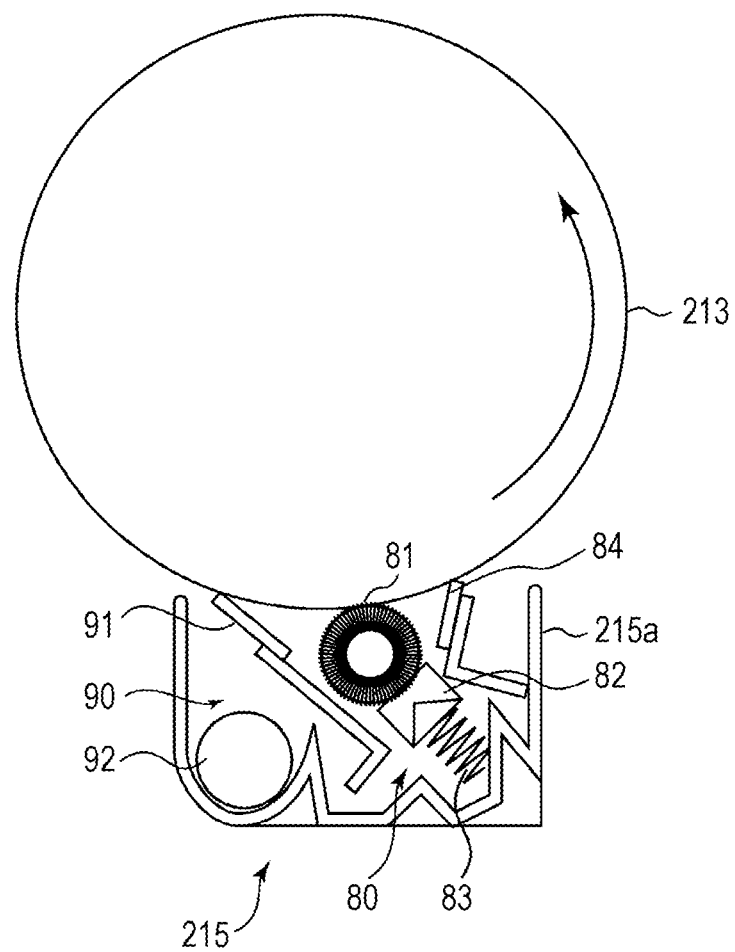
FIG. 4 may be a diagram schematically illustrating a configuration of a drum cleaning device.

FIG. 3 is a perspective view illustrating an example of the drum cleaning device 215. FIG. 4 is a diagram schematically illustrating a configuration of the drum cleaning device 215.

As illustrated in FIGS. 3 and 4, the drum cleaning device 215 includes a cleaning unit 90 and a lubricant application unit 80. FIG. 3 mainly illustrates a configuration of the lubricant application unit 80 and omits the cleaning unit 90. Each component of the cleaning unit 90 and the lubricant application unit 80 may be attached to a storage case 215*a* to be a frame body of the drum cleaning device 215 by an appropriate method. The drum cleaning device 215 may be integrally mounted on the image forming apparatus 1 as a photosensitive unit together with the photosensitive drum 213, for example.

The present embodiment adopts a downstream application system in which the lubricant application unit 80 may be disposed downstream of the cleaning unit 90 in the rotation direction of the photosensitive drum 213. The lubricant application method may be an upstream application system in which the lubricant application unit 80 may be disposed upstream of the cleaning unit 90 in the rotation direction of the photosensitive drum 213.

The cleaning unit 90 includes a drum cleaning blade 91 that abuts on the surface of the photosensitive drum 213. The drum cleaning blade 91 may be an elastic member formed by molding urethane rubber or the like into a flat plate shape and has a width substantially equal to the longitudinal width of the photosensitive drum 213 (main scanning direction). For example, the drum cleaning blade 91 may be disposed so as to be in sliding contact with the photosensitive drum 213 at a predetermined contact angle (such as 15°) from a counter direction (direction in which edge part may be stretched when photosensitive drum 213 rotates).

The drum cleaning blade 91 scrapes transfer residual toner remaining on the surface of the photosensitive drum 213 as the photosensitive drum 213 rotates during image formation. The scraped transfer residual toner may be sent to a waste toner collection container (not illustrated) by a toner collection screw 92.

The lubricant application unit 80 includes a lubricant application brush 81 (lubricant application member), a solid lubricant 82, a lubricant pressing part 83, a fixing blade 84, and the like. The lubricant application unit 80 scrapes off the solid lubricant 82 with the lubricant application brush 81 and applies the powdery lubricant to the surface of the photosensitive drum 213. Note that instead of the lubricant application brush 81, a lubricant application member made of foam may be applied.

The lubricant application brush 81 is, for example, a roller-like brush in which a base fabric in which fibers such as polyester are implanted may be wound around a core metal and has a width substantially equal to the axial width of photosensitive drum 213. The lubricant application brush 81 may be fixed such that the surface of photosensitive drum 213 bites into the tip of the brush by a predetermined amount (e.g., biting amount: 0.5 mm to 1.5 mm). A drive motor 85 may be connected to the lubricant application brush 81 via a gear transmission mechanism 86.

When the controller 30 controls the drive motor 85, the lubricant application brush 81 rotates in a direction opposite to the rotation of photosensitive drum 213 (counter direction). The rotation speed of the drive motor 85 may be variable and may be controlled by the controller 30.

The solid lubricant 82 may be obtained by solidifying a lubricant into a rod shape, and has a predetermined hardness (e.g., pencil hardness: equivalent to F to HB). In the present embodiment, the solid lubricant 82 may be formed in a rectangular parallelepiped shape and may be fixed to a lubricant holder 87. As the lubricant, for example, zinc stearate (ZnSt) may be applied. The color of the surface of the solid lubricant 82 may be white.

The lubricant pressing part 83 includes, for example, a biasing member such as a compression spring. The lubricant pressing part 83 presses the solid lubricant 82 fixed to one end side of the biasing member toward the lubricant application brush 81 with a predetermined pressure. The pressing force by the lubricant pressing part 83 may be variably controlled.

The fixing blade 84 may be a flat plate-like member having a width substantially equal to the longitudinal width of the photosensitive drum 213. A part of the fixing blade 84 in sliding contact with the photosensitive drum 213 includes an elastic body such as urethane rubber. The fixing blade 84 may be disposed on the downstream side of the lubricant application brush 81 in the rotation direction of the photosensitive drum 213. The fixing blade 84 may be disposed so as to be in sliding contact with the photosensitive drum 213 at a predetermined contact angle (such as 50°) from a trailing direction (direction in an edge part may be dragged when photosensitive drum 213 rotates).

At the time of image formation, the lubricant may be scraped off from the surface of the solid lubricant 82 by rotation of the lubricant application brush 81, and the scraped lubricant may be applied to the photosensitive drum 213 at a contact part with the photosensitive drum 213. The applied lubricant may be leveled by the fixing blade 84 so as to have a uniform thickness. As consumption of the solid lubricant 82 progresses with durability, the height of the solid lubricant 82 decreases, and the lubricant holder 87 to which the solid lubricant 82 may be fixed rises (see FIGS. 12A to 12C).

The amount (hereinafter referred to as "lubricant application amount") of the solid lubricant 82 scraped off by the lubricant application brush 81 may be controlled by a lubricant application condition. The "lubricant application condition" includes, for example, the rotation speed of the lubricant application brush 81 (rotation speed of drive motor 85) and the pressing force by the lubricant pressing part 83. In the present embodiment, the lubricant application amount may be controlled by controlling the rotation speed of the lubricant application brush 81. The rotation speed of the lubricant application brush 81 may be represented by, for example, a peripheral speed ratio (called lubricant θ) with respect to the photosensitive drum 213.

At the initial stage of durability after the use of the drum cleaning device 215 may be started, no lubricant, toner, or the like adheres to the lubricant application brush 81, and no deterioration occurs. Therefore, for example, the operation (e.g., rotation speed) of the lubricant application brush 81 may be controlled according to the ease of scraping of the solid lubricant 82. The ease of scraping of the solid lubricant 82 may be represented by, for example, the hardness of the solid lubricant 82.

The hardness of the solid lubricant 82 may be determined on the basis of the object color of the solid lubricant 82. As a result of various studies on the characteristics (In particular, hardness of solid lubricant 82) of the solid lubricant 82, the present inventors have found that there may be a difference in the color of the solid lubricant 82 when quantified by a colorimeter even if the color may be the same white with the naked eye, and there may be a correlation between the hardness (ease of scraping) of the solid lubricant 82 and the object color of the solid lubricant 82. The present inventors have conceived the main technical features of the present disclosure on the basis of such findings.

That is, in the present embodiment, the object color of the solid lubricant 82 in which the ease of scraping of the solid lubricant 82 may be directly reflected may be colorimetrically measured, and the operation of the lubricant application brush 81 may be controlled on the basis of the colorimetric result. In controlling the operation of the lubricant application brush 81, it may be not necessary to consider external factors such as deterioration of the lubricant application brush 81, and the operation of the lubricant application brush 81 may be accurately and appropriately controlled. The colorimetry of the object color of the solid lubricant 82 may be performed, for example, after the end of a print job when no image may be being formed.

Specifically, a colorimeter 60 may be disposed so as to face the solid lubricant 82 and receives reflected light (including correctly reflected light and diffusely reflected light) from the surface of the solid lubricant 82. The colorimeter 60 determines the object color of the solid lubricant 82 on the basis of the reflectance (amount of light) of each wavelength component of the received reflected light. A colorimetric result in the colorimeter 60 may be transmitted to the controller 30. The controller 30 controls the rotation speed of lubricant application brush 81 on the basis of the colorimetric result. Since the hardness (difficulty in scraping) of the solid lubricant 82 may be reflected in the colorimetric result of the colorimeter 60, the controller 30 controls the rotation speed of the lubricant application brush 81 according to the hardness of the solid lubricant 82. Note that a known colorimeter may be applied to the colorimeter 60.

The colorimeter 60 may be provided at a position where the object color of the solid lubricant 82 may be measured in the lubricant application unit 80. The colorimeter 60 may have a slit that limits the colorimetry region in the height direction of the solid lubricant 82. Preferably, the colorimeter 60 may be disposed so as to partially perform colorimetry in the vicinity of a sliding contact part with the lubricant application brush 81 in the height direction of the solid lubricant 82. As a result, since the ease of scraping of the solid lubricant 82 at present may be reflected in the colorimetric result, the rotation speed of the lubricant application brush 81 may be controlled to an appropriate value according to the ease of scraping of the solid lubricant 82.

Figure 5:
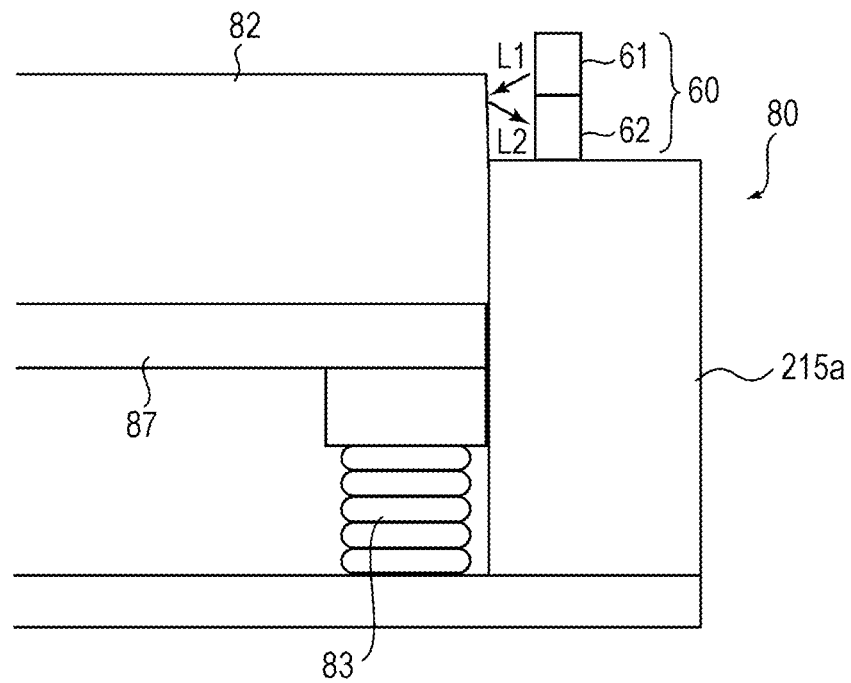
FIG. 5 may be a diagram illustrating an example of a colorimeter.

For example, as illustrated in FIG. 5, the colorimeter 60 includes a light source 61 that irradiates the solid lubricant 82 with light L1, and a light receiver 62 that receives reflected light L2 reflected by the surface of the solid lubricant 82.

The light source 61 includes, for example, a light emitting diode. The light source 61 may include a light emitting diode and a condensing optical system such as a condensing lens. Furthermore, the light source 61 may include a light diffusion sheet or may include a line type light source in order to uniformly emit light in the width direction of the solid lubricant 82. Note that the wavelength of the light emitting diode may be not particularly limited, but preferably includes a red wavelength component (such as 680 nm) in order to identify ease of scraping of the solid lubricant 82.

The light receiver 62 includes, for example, a photodiode having sensitivity to a wavelength component of a specific color (e.g., red). The light receiver 62 may include, in addition to the photodiode, a spectroscopic optical system such as a diffraction grating or a prism and an optical filter that selectively transmits the wavelength of the reflected light L2.

Here, the "wavelength component of a specific color" may be preferably a wavelength component in which a significant difference appears depending on the hardness of the solid lubricant 82, and is, for example, a red wavelength component. Note that a color other than red may be used as the specific color.

By providing the light source 61 and the light receiver 62 in the colorimeter 60, colorimetry may be performed under the same illumination condition, so that the calculation load for determining the color of the solid lubricant 82 may be reduced, and the colorimetry accuracy may be stabilized.

Preferably, the colorimeter 60 may be disposed so as to face an end surface in the longitudinal direction of the solid lubricant 82. That is, the end surface in the longitudinal direction of the solid lubricant 82 may be a colorimetric surface to be colorimetrically measured by the colorimeter 60. As a result, the lubricant scraped off by the lubricant application brush 81 may be less likely to scatter to the colorimeter 60, so that the lubricant may be prevented from adhering to the light source 61 or the light receiver 62, and a normal colorimetry result may be obtained.

Figure 6:
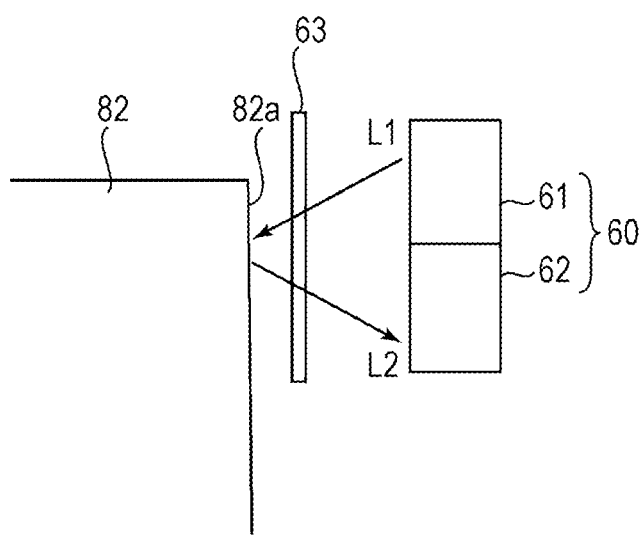
FIG. 6 may be a diagram illustrating another example of the colorimeter.

Furthermore, as illustrated in FIG. 6, a shielding member 63 that physically shields scattering of the lubricant may be disposed between a colorimetric surface 82a of the solid lubricant 82 and the colorimeter 60. As the shielding member 63, for example, an openable and closable shutter member that may be in an open state at the time of color measurement and in a closed state at the time of non-color measurement during image formation may be applied. Furthermore, for example, the shielding member 63 may be a transparent fixing plate capable of transmitting light. As a result, it may be possible to reliably prevent the lubricant from adhering to the light source 61 or the light receiver 62 of the colorimeter 60.

Figure 7:
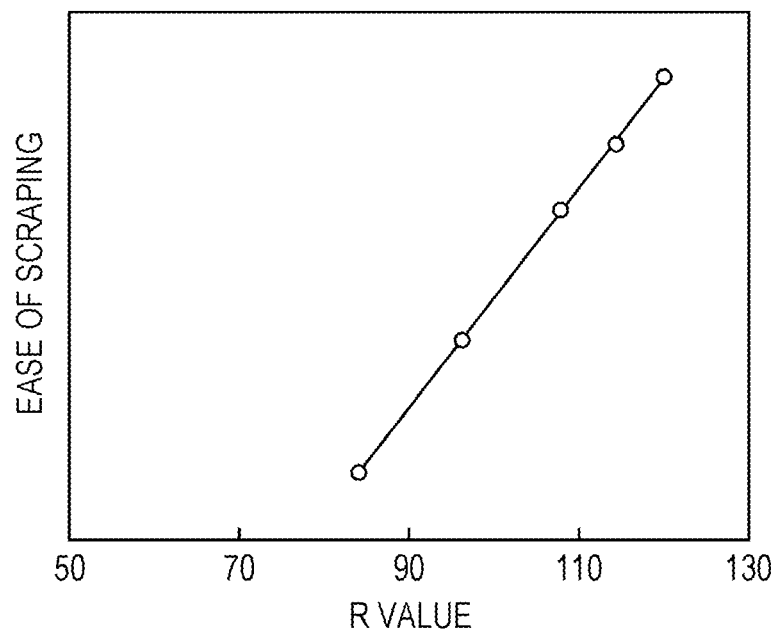
FIG. 7 may be a diagram illustrating an example of a relationship between an amount (R value) of a wavelength component of a specific color and ease of scraping of a solid lubricant.

FIG. 7 is a diagram illustrating an example of a relationship between the amount (R value) of the wavelength component of the specific color included in the colorimetric result and the ease of scraping (hardness) of the solid lubricant 82. As illustrated in FIG. 7, there may be a correlation between the amount (R value) of the wavelength component of the specific color included in the colorimetric result and the ease of scraping (hardness) of the solid lubricant 82. FIG. 7 indicates that the solid lubricant 82 may be harder and less likely to be scraped as the amount of the wavelength component of the specific color may be smaller.

Figure 8:
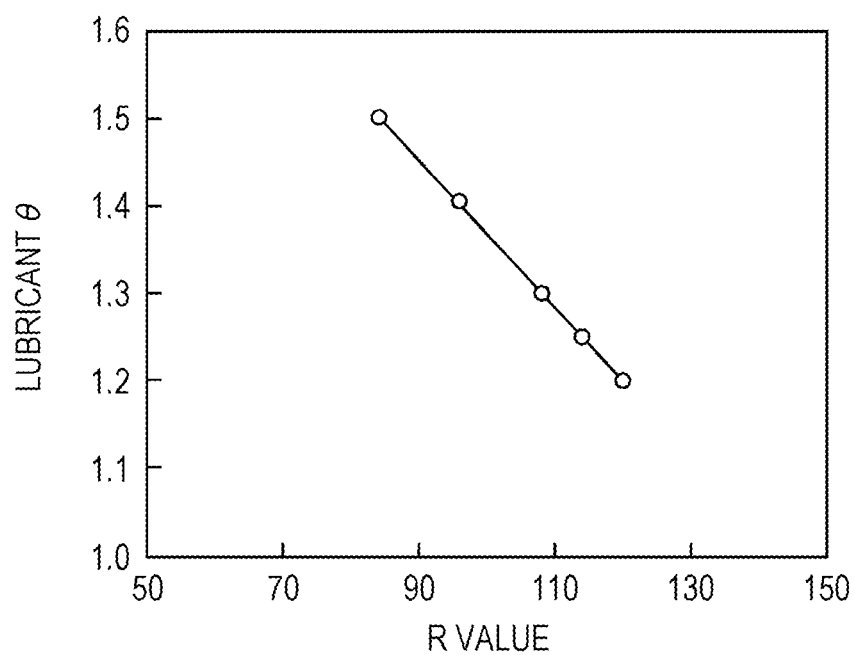
FIG. 8 may be a diagram illustrating an example of a relationship between an amount (R value) of a wavelength component of a specific color and an optimum rotation speed of a lubricant application brush.

On the other hand, the optimum rotation speed of the lubricant application brush 81 may be determined in advance according to the ease of scraping (hardness) of the solid lubricant 82. For example, the rotation speed of the lubricant application brush 81 may be set to be larger as the solid lubricant 82 may be less likely to be scraped. Therefore, the relationship as illustrated in FIG. 8 is obtained between the amount (R value) of the wavelength component of the specific color included in the colorimetric result and the optimum rotation speed of lubricant application brush 81. The controller 30 sets the rotation speed of the lubricant application brush 81 with reference to the relationship illustrated in FIG. 8.

As described above, at the initial stage of durability, the rotation speed of the lubricant application brush 81 may be controlled on the basis of the amount of the wavelength component of the specific color included in the colorimetric result, that is, the ease of scraping (hardness) of the solid lubricant 82. On the other hand, for example, after the middle of durability in which the state of the lubricant application brush 81 (e.g., brush degradation (including adhesion of lubricant or toner)) and the decrease in pressing force by the lubricant pressing part 83 affect the lubricant application amount, the rotation speed of the lubricant application brush 81 may be controlled such that the actual consumption speed (lubricant scraping speed) of the solid lubricant 82 falls within an appropriate range.

In the present embodiment, the colorimetric surface 82a of the solid lubricant 82 may be subjected to predetermined surface treatment, and the consumption speed of the solid lubricant 82 may be determined using the colorimetric result of the solid lubricant 82. Specifically, the colorimetric surface of the solid lubricant 82 may be subjected to surface treatment such that the colorimetric result continuously changes with consumption of the solid lubricant 82.

Figure 9:
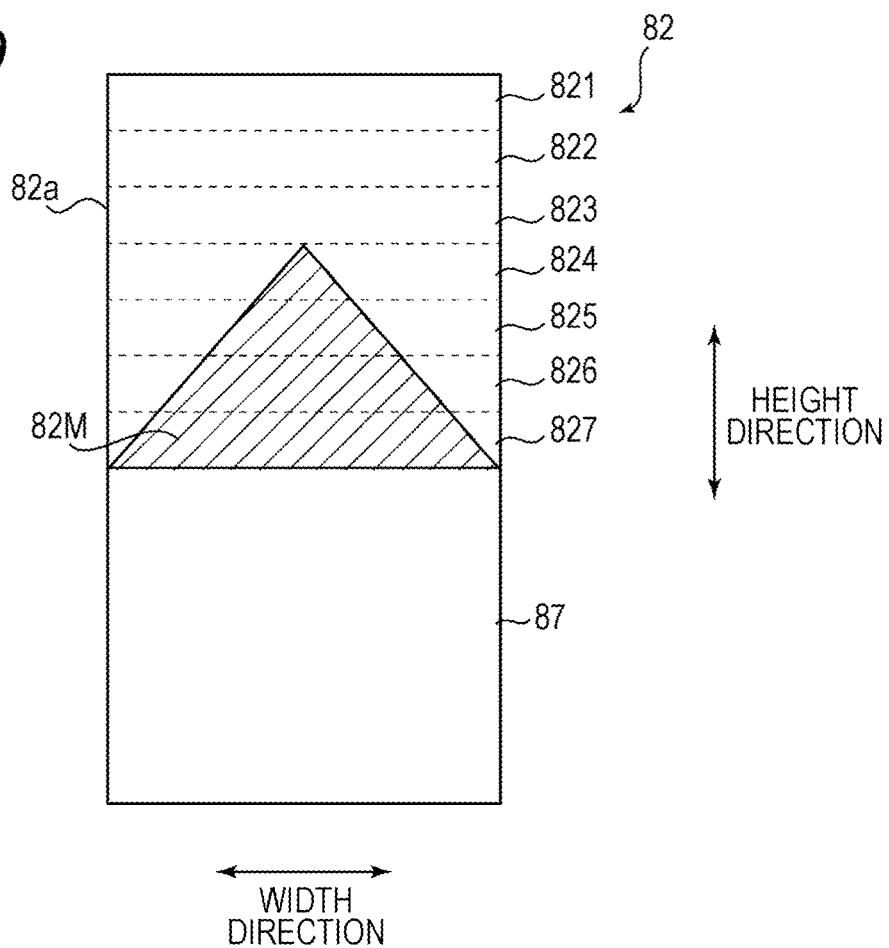
FIG. 9 may be a diagram illustrating an example of surface treatment applied to a colorimetric surface of a solid lubricant.

FIG. 9 is a diagram illustrating an example of surface treatment applied to the colorimetric surface 82a of the solid lubricant 82.

In the example illustrated in FIG. 9, the colorimetric surface 82a of the solid lubricant 82 may be partitioned into lubricant regions 821 to 827 divided into seven equal parts in the thickness direction of the solid lubricant 82 (consumption direction of solid lubricant 82). The lubricant region 821 side may be the side that comes into contact with the lubricant application brush 81.

No special surface treatment may be applied to the lubricant regions 821 to 823. When the colorimetric region to be colorimetrically measured by the colorimeter 60 may be the lubricant region 821 to 823, the colorimetric result may be dominated by the wavelength component based on the object color of the solid lubricant 82.

On the other hand, in the lubricant regions 824 to 827, a determination reference mark 82M of an isosceles triangle filled with a specific color (e.g., red) may be formed. When the colorimetric region to be colorimetrically measured by the colorimeter 60 may be the lubricant region 824 to 827, the colorimetric result may be dominated by the wavelength component based on the color of the determination reference mark 82M included in the colorimetric region.

That is, in the colorimetric result of the colorimeter 60, the amount of the wavelength component of the specific color may be clearly larger in the lubricant regions 824 to 827 than in the lubricant regions 821 to 823. Therefore, on the basis of the amount of the wavelength component of the specific color included in the colorimetric result, whether the colorimetric region may be the lubricant region 821 to 823 in which the determination reference mark 82M may be not formed or the lubricant region 824 to 827 in which the determination reference mark 82M may be formed may be easily determined, for example, by comparing with a predetermined threshold.

Furthermore, in the lubricant region 824 to 827, the area where the determination reference mark 82M may be formed, that is, the area filled with a specific color increases as it goes farther away from the side close to the lubricant application brush 81, and the colorimetric result continuously changes as the consumption of the solid lubricant 82 progresses. Therefore, which of the lubricant regions 824 to 827 may be the colorimetric region may be determined on the basis of the amount of the wavelength component of the specific color included in the colorimetric result.

Furthermore, by performing colorimetry of the solid lubricant 82 before and after executing a print job, the consumption speed of the solid lubricant 82 may be calculated on the basis of the displacement amount of the colorimetric region and the sliding distance of the lubricant application brush 81 during the print job. The controller 30 controls the rotation speed of lubricant application brush 81 such that the calculated lubricant consumption speed falls within an appropriate range.

Figure 10:
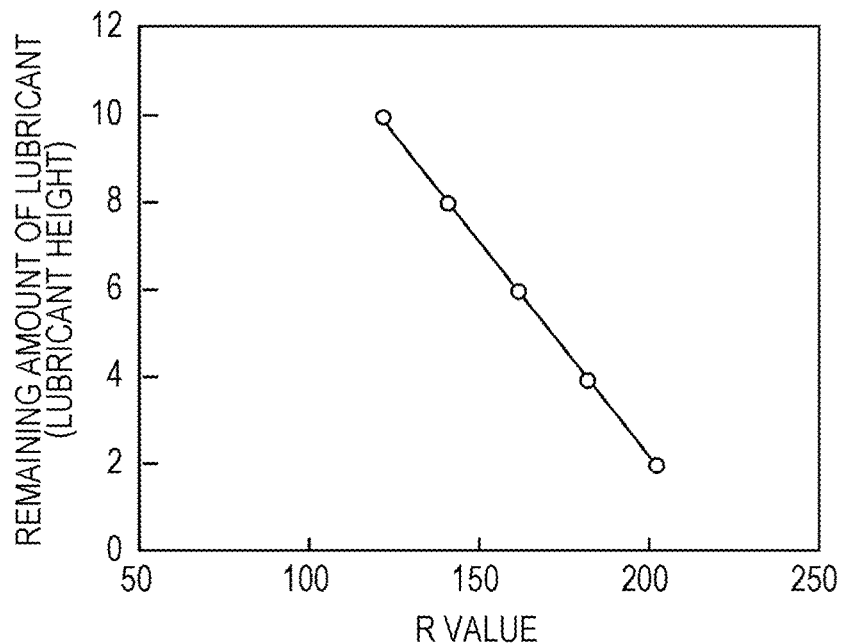
FIG. 10 may be a diagram illustrating an example of a relationship between an amount (R value) of a wavelength component of a specific color and a remaining amount of lubricant.

Moreover, the colorimetric region directly represents the remaining amount of the solid lubricant 82. That is, as illustrated in FIG. 10, the amount (R value) of the wavelength component of the specific color included in the colorimetric result may be associated with the remaining amount of lubricant. FIG. 10 indicates that the R value increases and the remaining amount of lubricant decreases as the colorimetric region changes from the lubricant region 821 toward the lubricant region 827. When the colorimetric region may be the lubricant region 827 and the remaining amount of lubricant may be small, it may be also possible to display on the display unit 121 or the like to notify that it may be time to replace the solid lubricant 82, for example.

Figure 11:
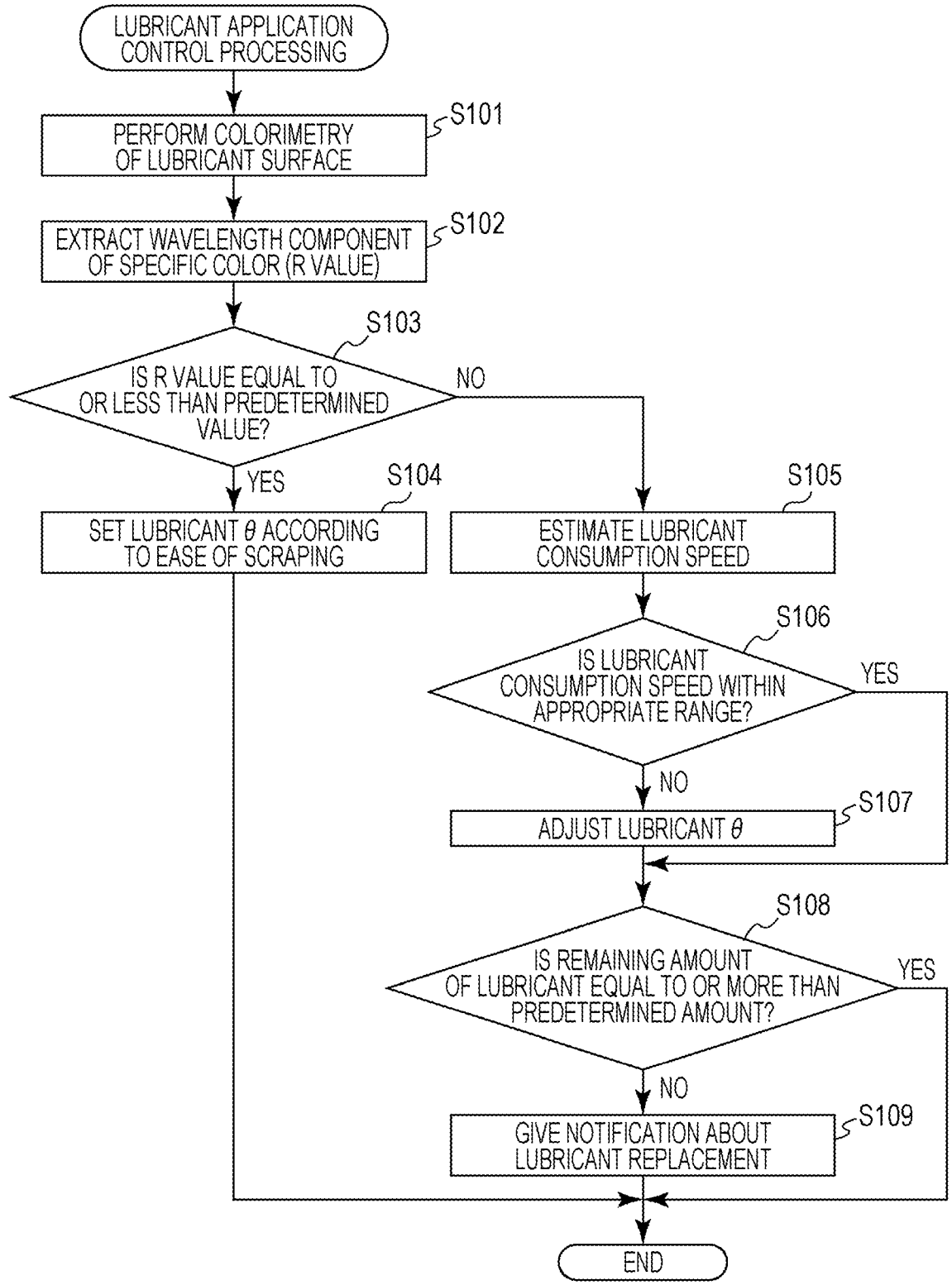
FIG. 11 may be a flowchart illustrating an example of lubricant application control processing.

FIG. 11 is a flowchart illustrating an example of lubricant application control processing. This processing may be achieved, for example, by the CPU 31 executing a predetermined program stored in the ROM 32 as a print job ends in the image forming apparatus 1.

In step S101 of FIG. 11, the controller 30 controls the operation of the colorimeter 60 to perform colorimetry of the solid lubricant 82. A colorimetric result corresponding to the colorimetric region in the solid lubricant 82 may be obtained.

Figure 12A:
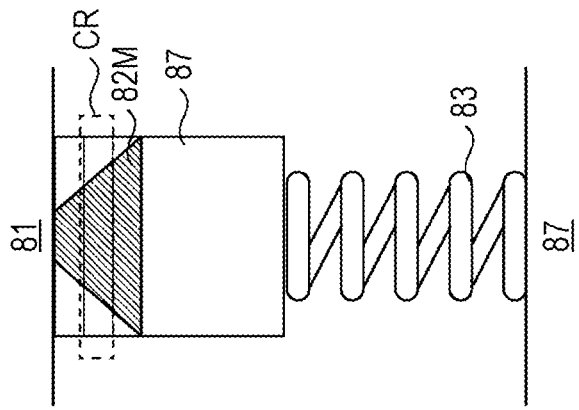
FIG. 12A may be a diagram illustrating a consumption state of a solid lubricant associated with durability.

For example, in the initial stage of durability, as illustrated in FIG. 12A, since the lubricant region where the determination reference mark 82M may be not formed may be the colorimetric region CR, a colorimetric result reflecting the hardness of the solid lubricant 82 may be obtained.

Figure 12B:
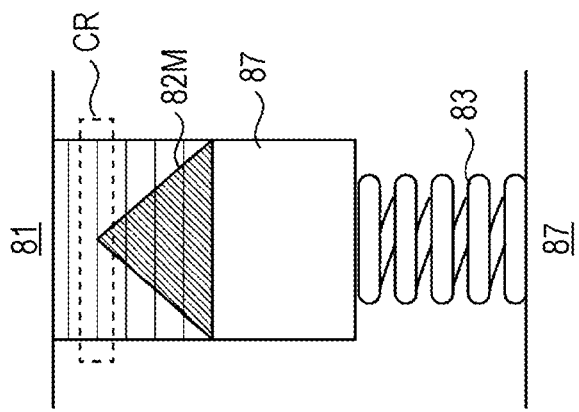
FIG. 12B may be a diagram illustrating a consumption state of a solid lubricant associated with durability.
Figure 12C:
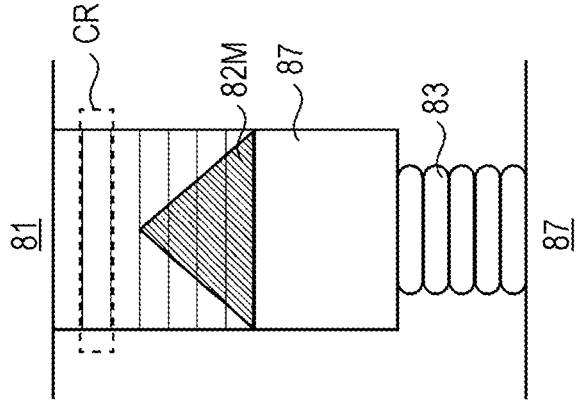
FIG. 12C may be a diagram illustrating a consumption state of a solid lubricant associated with durability.

Further, for example, in the case of the middle to end of durability, as illustrated in FIGS. 12B and 12C, since the lubricant region where the determination reference mark 82M may be formed may be a colorimetric region CR, a colorimetric result corresponding to the area of the determination reference mark 82M included in the colorimetric region CR may be obtained.

In step S102, the controller 30 extracts a wavelength component of a specific color (e.g., red) from the colorimetric result acquired in step S101.

In step S103, the controller 30 determines whether the amount (R value) of the wavelength component of the specific color extracted in step S102 may be equal to or less than a threshold value. When the R value may be equal to or less than the predetermined value ("YES" in step S103), the processing proceeds to step S104. When the R value may be not equal to or less than the predetermined value ("NO" in step S103), the processing proceeds to step S105.

The threshold value serving as the determination reference may be a value for determining whether the lubricant region 821 to 823 in which the determination reference mark 82M may be not formed may be the lubricant region or the lubricant region 824 to 827 in which the determination reference mark 82M may be formed may be the lubricant region and may be experimentally set in advance. For example, the threshold may be appropriately set by comparing the amount of the wavelength component of the specific color included in the colorimetric result when the colorimetric region CR may be the lubricant region 821 to 823 with the amount of the wavelength component of the specific color included in the colorimetric result when the colorimetric region CR may be the lubricant region 824 to 827.

In step S104, the controller 30 sets the rotation speed of the lubricant application brush 81 on the basis of the colorimetric result. The controller 30 sets the rotation speed of the lubricant application brush 81 with reference to, for example, the relationship between the amount (R value) of the wavelength component of the specific color and the rotation speed (lubricant θ) of the lubricant application brush 81 illustrated in FIG. 8.

According to FIG. 8, as the wavelength component of the specific color included in the colorimetric result may be larger, the solid lubricant 82 may be more likely to be scraped, and the rotation speed of the lubricant application brush 81 may be set to be smaller. Conversely, as the wavelength component of the specific color included in the colorimetric result may be smaller, the solid lubricant 82 may be less likely to be scraped, and the rotation speed of the lubricant application brush 81 may be set to be larger.

As described above, when the colorimetric region may be the lubricant region 821 to 823 and the durability may be in the initial stage, the rotation speed of the lubricant application brush 81 may be set according to the ease of scraping of the solid lubricant 82 by the processing in steps S101 to S104.

On the other hand, in the processing of step S104, when the amount of the wavelength component of the specific color may be not equal to or less than the predetermined value, that is, when the colorimetric region CR may be the lubricant region 824 to 827 and may be in the middle to end of durability, the processing of steps S105 to S109 are executed.

In step S105, the controller 30 estimates the lubricant consumption speed. The lubricant consumption speed may be calculated, for example, on the basis of the displacement amount of the colorimetric region CR from the previous time and the sliding distance of the lubricant application brush 81 during a print job (see following formula (1)).

$$\text{Lubricant consumption speed} = \text{displacement amount of colorimetric region/sliding distance of lubricant application brush} \quad (1)$$

The position of the current colorimetric region CR may be estimated on the basis of the amount (R value) of the wavelength component of the specific color included in the colorimetric result. In formula (1), the displacement amount of the colorimetric region may be represented by a difference between the position of the previous colorimetric region CR and the position of the current colorimetric region. Note that it may be also possible to, instead of calculating the position of the colorimetric region CR, obtain the displacement amount of the colorimetric region according to a difference between the previous R value and the current R value.

In step S106, the controller 30 determines whether the lubricant consumption speed estimated in step S105 may be within an appropriate range. When the lubricant consumption speed may be within the appropriate range ("YES" in step S106), the processing proceeds to step S108. When the lubricant consumption speed may be outside the appropriate range ("NO" in step S106), the processing proceeds to step S107.

In step S107, the controller 30 adjusts the rotation speed of the lubricant application brush 81 such that the lubricant consumption speed falls within a predetermined range. For example, the controller 30 increases the rotation speed of the lubricant application brush 81 when the lubricant consumption speed estimated in step S105 may be lower than the appropriate range and decreases the rotation speed of the lubricant application brush 81 when the lubricant consumption speed may be higher than the appropriate range.

In step S108, the controller 30 determines whether the remaining amount of lubricant may be equal to or more than a predetermined amount. When the remaining amount of lubricant may be equal to or more than the predetermined amount ("YES" in step S108), the series of lubricant application control processing may be ended. When the remaining amount of lubricant may be not equal to or more than the predetermined amount ("NO" in step S108), the processing proceeds to step S109.

In step S109, for example, the controller 30 displays a message prompting the replacement of the solid lubricant 82 on the display unit 121 and notifies that it may be time to replace the solid lubricant 82.

As described above, in a case where the colorimetric region may be the lubricant region 824 to 827 and it may be the middle to end of durability, the rotation speed of the lubricant application brush 81 may be set according to the lubricant consumption speed to be performed by the processing of steps S101 to S103 and S105 to S109.

As described above, the image forming apparatus 1 according to the present embodiment includes the following features singly or in appropriate combination.

That is, the image forming apparatus 1 includes the photosensitive drum 213 (image carrier), the solid lubricant 82, the lubricant application brush 81 (lubricant application member) that scrapes off the solid lubricant 82 and applies the scraped solid lubricant 82 to the surface of the photosensitive drum 213, the colorimeter 60 that performs colorimetry of the colorimetric surface 82a of the solid lubricant 82, and the controller 30 that sets A lubricant application condition (e.g., rotation speed of lubricant application brush 81) so as to obtain a predetermined lubricant application amount on the basis of a colorimetric result obtained by the colorimeter 60.

According to the image forming apparatus 1, the ease of scraping (hardness) of the solid lubricant 82 and the lubricant consumption speed may be estimated accurately on the basis of the colorimetric result of the solid lubricant 82, and an appropriate lubricant application condition may be set, so that an appropriate amount of lubricant may be applied to the photosensitive drum 213 without excess or deficiency. Furthermore, it may be possible to prolong the life of the photosensitive unit while maintaining constant image quality.

Furthermore, in the image forming apparatus 1, the colorimetric surface 82a may be an end surface in the longitudinal direction of the solid lubricant 82. As a result, the lubricant scraped off by the lubricant application brush 81 may be less likely to scatter to the colorimeter 60, so that the lubricant may be prevented from adhering to the colorimeter 60, and a normal colorimetry result may be obtained.

Furthermore, in the image forming apparatus 1, the colorimetric surface 82a may be subjected to surface treatment such that the colorimetric result continuously changes with consumption of the solid lubricant 82. As a result, the consumption situation of the solid lubricant 82 may be grasped on the basis of the colorimetric result, and, for example, an appropriate lubricant application condition may be set according to the lubricant consumption speed.

Furthermore, in the image forming apparatus 1, the colorimeter 60 includes the light source 61 that irradiates the solid lubricant 82 with light, and the light receiver 62 that receives reflected light from the solid lubricant 82. As a result, since the colorimetry may be performed under the same illumination condition, the calculation load for determining the color of the solid lubricant 82 may be reduced, and the colorimetric accuracy may be stabilized.

Furthermore, in the image forming apparatus 1, the controller 30 sets the lubricant application condition in accordance with the ease of scraping of the solid lubricant 82 reflected in the colorimetric result. As a result, even when the hardness of the solid lubricant 82 changes as the consumption of the solid lubricant 82 progresses, an appropriate lubricant application condition may be set, so that an appropriate amount of lubricant may be applied to the photosensitive drum 213.

Furthermore, in the image forming apparatus 1, the controller 30 estimates the lubricant consumption speed on the basis of the colorimetric result and sets the lubricant application condition according to the estimated lubricant consumption speed. As a result, it may be possible to set an appropriate lubricant application condition according to the actual lubricant application situation.

Furthermore, in the image forming apparatus 1, the lubricant application member may be the lubricant application brush 81 that rotates in sliding contact with the photosensitive drum 213 (image carrier), and the controller 30 sets the rotation speed of the lubricant application brush 81. As a result, the lubricant application amount may be controlled easily.

Furthermore, in the image forming apparatus 1, the controller 30 sets the lubricant application condition on the basis of the wavelength component of the specific color (e.g., red) included in the colorimetric result. As a result, it may be possible to easily recognize the difference in ease of scraping (hardness) of the solid lubricant 82, and the calculation load therefor may be also reduced.

Furthermore, the image forming apparatus 1 includes the shielding member 63 that acts as a spatial shield between the solid lubricant 82 and the colorimeter 60. Specifically, the shielding member 63 may be openable and closable, and may be in an open state at the time of colorimetry of the colorimetric surface 82a by the colorimeter 60 and may be in a closed state at the time of non-colorimetry. As a result, adhesion of the lubricant to the colorimeter 60 may be prevented reliably, and a normal colorimetry result may be obtained.

Furthermore, the image forming apparatus 1 includes the controller 30 (remaining amount notifier) that estimates the remaining amount of the solid lubricant 82 on the basis of the colorimetric result and gives notification about the estimated remaining amount of lubricant. As a result, since an appropriate replacement time of the solid lubricant 82 may be known, it may be possible to prevent deterioration in image quality due to exhaustion of the solid lubricant 82.

Although the invention made by the present inventors has been specifically described above on the basis of the embodiment, the present invention may be not limited to the above embodiment and may be modified without departing from the gist of the invention.

For example, an imaging device such as a CCD camera that images the surface of the solid lubricant 82 may be applied as the colorimeter 60, and the colorimetry of the solid lubricant 82 may be performed by analyzing the image of the surface of the solid lubricant 82 captured by the imaging device.

Furthermore, the determination reference mark 82M formed on the solid lubricant 82 may be any mark as long as the amount of wavelength components of a specific color included in the colorimetric result continuously changes with consumption of the solid lubricant 82, and the shape and color are not particularly limited. For example, in the determination reference mark 82M illustrated in FIG. 9, the vertex of the isosceles triangle may be located on the side of the initial stage of durability (e.g., boundary between lubricant region 821 and lubricant region 822).

Alternatively, in place of the determination reference mark 82M having coloring, the colorimetric surface 82a may be subjected to rough surface processing so that the amount of the wavelength component of the specific color continuously changes.

Although embodiments of the present invention have been described and illustrated in detail, the disclosed embodiments are made for purposes of illustration and example only and not limitation. The scope of the present invention should be interpreted not by the above description but by terms of the appended claims and may be intended to include all modifications within the meaning and scope equivalent to the claims.

What is claimed:

1. An image forming apparatus comprising:
   an image carrier;
   a solid lubricant;
   a lubricant application member that scrapes off the solid lubricant and applies the scraped solid lubricant to a surface of the image carrier;
   a colorimeter that performs colorimetry of a colorimetric surface of the solid lubricant; and
   a hardware processor that sets a lubricant application condition such that a predetermined amount of lubricant is applied on the basis of a colorimetric result obtained by the colorimeter.

2. The image forming apparatus according to claim 1, wherein
   the colorimetric surface is an end surface in a longitudinal direction of the solid lubricant.

3. The image forming apparatus according to claim 1, wherein
   the colorimetric surface is subjected to surface treatment such that the colorimetric result continuously changes with consumption of the solid lubricant.

4. The image forming apparatus according to claim 1, wherein
   the colorimeter includes a light source that irradiates the solid lubricant with light and a light receiver that receives reflected light from the solid lubricant.

5. The image forming apparatus according to claim 1, wherein
   the hardware processor sets the lubricant application condition according to the ease of scraping of the solid lubricant reflected in the colorimetric result.

6. The image forming apparatus according to claim 1, wherein
   the hardware processor estimates a lubricant consumption speed on the basis of the colorimetric result, and sets the lubricant application condition according to the estimated lubricant consumption speed.

7. The image forming apparatus according to claim 1, wherein
   the lubricant application member is a lubricant application brush that rotates in sliding contact with the image carrier, and
   the hardware processor sets a rotation speed of the lubricant application brush.

8. The image forming apparatus according to claim 1, wherein
   the hardware processor sets the lubricant application condition on the basis of a wavelength component of a specific color included in the colorimetric result.

9. The image forming apparatus according to claim 8, wherein
   the specific color is red.

10. The image forming apparatus according to claim 1 further comprising
    a shielding member that acts as a spatial shield between the solid lubricant and the colorimeter.

11. The image forming apparatus according to claim 10, wherein
    the shielding member is openable and closable, and is in an open state at the time of colorimetry of the colorimetric surface by the colorimeter and is in a closed state at the time of non-colorimetry.

12. The image forming apparatus according to claim 1 further comprising
    a remaining amount notifier that estimates a remaining amount of the solid lubricant on the basis of the colorimetric result and gives notification about the estimated remaining amount of the lubricant.

* * * * *